U S009792635B2

(12) United States Patent
Sasaki

(10) Patent No.: US 9,792,635 B2
(45) Date of Patent: Oct. 17, 2017

(54) INFORMATION PROCESSING APPARATUS AND METHOD FOR UPDATING FEATURE VALUES OF PRODUCTS FOR OBJECT RECOGNITION

(71) Applicant: TOSHIBA TEC KABUSHIKI KAISHA, Tokyo (JP)

(72) Inventor: Yuta Sasaki, Izunokuni Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 144 days.

(21) Appl. No.: 14/743,576

(22) Filed: Jun. 18, 2015

(65) Prior Publication Data

US 2015/0379717 A1    Dec. 31, 2015

(30) Foreign Application Priority Data

Jun. 30, 2014    (JP) .................. 2014-134960

(51) Int. Cl.
 *G06K 9/00* (2006.01)
 *G06Q 30/06* (2012.01)
 *G06K 9/46* (2006.01)
 *G06K 9/62* (2006.01)
 *G06K 9/68* (2006.01)

(52) U.S. Cl.
 CPC ..... *G06Q 30/0609* (2013.01); *G06K 9/00369* (2013.01); *G06K 9/00375* (2013.01); *G06K 9/4652* (2013.01); *G06K 9/6255* (2013.01); *G06K 9/6814* (2013.01)

(58) Field of Classification Search
 CPC ........... G06K 9/00369; G06K 9/00375; G06K 9/4652; G06K 9/6255; G06K 9/6814
 See application file for complete search history.

(56) References Cited

U.S. PATENT DOCUMENTS

| 6,990,473 B1* | 1/2006 | Yabuki ................. G06Q 10/087 705/14.38 |
| 9,394,107 B1* | 7/2016 | Eller ....................... B21B 41/00 |
| 2010/0217678 A1* | 8/2010 | Goncalves ........... G06Q 20/203 705/22 |
| 2011/0063465 A1* | 3/2011 | Nanu ...................... G06T 5/008 348/222.1 |
| 2013/0101168 A1 | 4/2013 | Naito et al. |
| 2014/0039990 A1* | 2/2014 | Georgi ............... G06Q 30/0229 705/14.3 |

FOREIGN PATENT DOCUMENTS

JP    2013-089085 A    5/2013

* cited by examiner

*Primary Examiner* — Shefali Goradia
(74) *Attorney, Agent, or Firm* — Patterson & Sheridan, LLP

(57) ABSTRACT

An information processing apparatus includes a storage unit, an image capturing unit, and a processing unit. The storage unit stores a plurality of feature values to be used for object recognition and an update program for the feature values, with respect to each of products registered for sale. The image capturing unit is configured to acquire an image of a product registered for sale. The processing unit is configured to extract a feature value of the product from the acquired image, select one of the plurality of the feature values corresponding to the product as a replacement target, by executing the update program corresponding to the product, and replace the selected feature value with the extracted feature value.

17 Claims, 11 Drawing Sheets

FIG. 3

| PRODUCT ID | PRODUCT CLASSIFICATION | PRODUCT NAME | SPECIES | UNIT PRICE | ILLUSTRATION IMAGE | FEATURE DATA |
|---|---|---|---|---|---|---|
| XXXXXXXX | VEGETABLE | XX | | 100 YEN | | XXXXXXXX |
| ...... | ...... | ...... | ...... | ...... | ...... | ...... |
| XXXXXXXX | FRUIT | YY | YY_1 | 100 YEN | | XXXXXXXX |
| XXXXXXXX | FRUIT | YY | YY_2 | 150 YEN | | XXXXXXXX |
| XXXXXXXX | FRUIT | YY | YY_3 | 200 YEN | | XXXXXXXX |
| XXXXXXXX | FRUIT | YY | YY_4 | 250 YEN | | XXXXXXXX |

| PRODUCT ID | MANAGEMENT NUMBER | UPDATE DATE | USAGE FREQUENCY ORDER |
|---|---|---|---|
| XXXXXXXX | 1 | 2014/1/1 | 2 |
| | 2 | 2014/1/20 | 5 |
| | 3 | 2014/2/1 | 4 |
| | 4 | 2014/2/15 | 1 |
| | 5 | 2014/3/4 | 3 |
| | ... | ... | ... |
| ... | ... | ... | ... |

| PRODUCT ID | REPLACEMENT METHOD |
|---|---|
| XXXXXXX | FIRST |
| XXXXXXX | SECOND |
| XXXXXXX | THIRD |
| ... | ... |

INFORMATION PROCESSING APPARATUS AND METHOD FOR UPDATING FEATURE VALUES OF PRODUCTS FOR OBJECT RECOGNITION

CROSS-REFERENCE TO RELATED APPLICATION

This application is based upon and claims the benefit of priority from Japanese Patent Application No. 2014-134960, filed Jun. 30, 2014, the entire contents of which are incorporated herein by reference.

FIELD

Embodiments described herein relate generally to an information processing apparatus and a method for updating feature values of products for object recognition.

BACKGROUND

In the related art, there is a technique to identify an object by comparing a feature value (feature data) extracted from an image of the object with a feature value of each of a plurality of registered objects. Such a technique is called as generic object recognition. The generic object recognition can be typically applied to a store system such as a point-of-sale (POS) terminal, to identify a product to be purchased that does not have a symbol code thereon, such as vegetables, fruits, and so on.

Accuracy of the object recognition basically depends on similarity of the feature value of the registered objects with the feature value of the object to be identified. To maintain the accuracy, a new feature value that is likely to have high similarity with the feature value of the object to be identified may need to be added to a storage unit that stored the feature values of the registered objects. When there is not sufficient space in the storage unit, one of the stored feature values may need to be replaced with the new feature data. When a plurality of feature values is registered for a registered product, it would be preferable to select one of the feature values for replacement, so as not to reduce the accuracy.

DESCRIPTION OF THE DRAWINGS

FIG. 3 illustrates a data configuration of a PLU file stored in the POS terminal.

FIG. 4 illustrates a data configuration of a dictionary managing file stored in the POS terminal.

FIG. 5 illustrates a data configuration of a replacement method setting file stored in the POS terminal.

DETAILED DESCRIPTION

An object of the exemplary embodiments is to provide an information processing apparatus and a program that may replace existing data by a replacement method in accordance with a classification of merchandise with respect to the data registration in a dictionary.

In general, according to one embodiment, an information processing apparatus includes a storage unit, an image capturing unit, and a processing unit. The storage unit stores a plurality of feature values to be used for object recognition and an update program for the feature values, with respect to each of products registered for sale. The image capturing unit is configured to acquire an image of a product registered for sale. The processing unit is configured to extract a feature value of the product from the acquired image, select one of the plurality of the feature values corresponding to the product as a replacement target, by executing the update program corresponding to the product, and replace the selected feature value with the extracted feature value.

Hereinafter, as an example of a check-out system, an information processing apparatus and a program according to an embodiment are described with reference to drawings. The store system is a check-out system (POS system) including a POS terminal that registers merchandise and performs settlement according to one transaction. The exemplary embodiment is an application example to a check-out system introduced to a store such as a supermarket.

Figure 1:
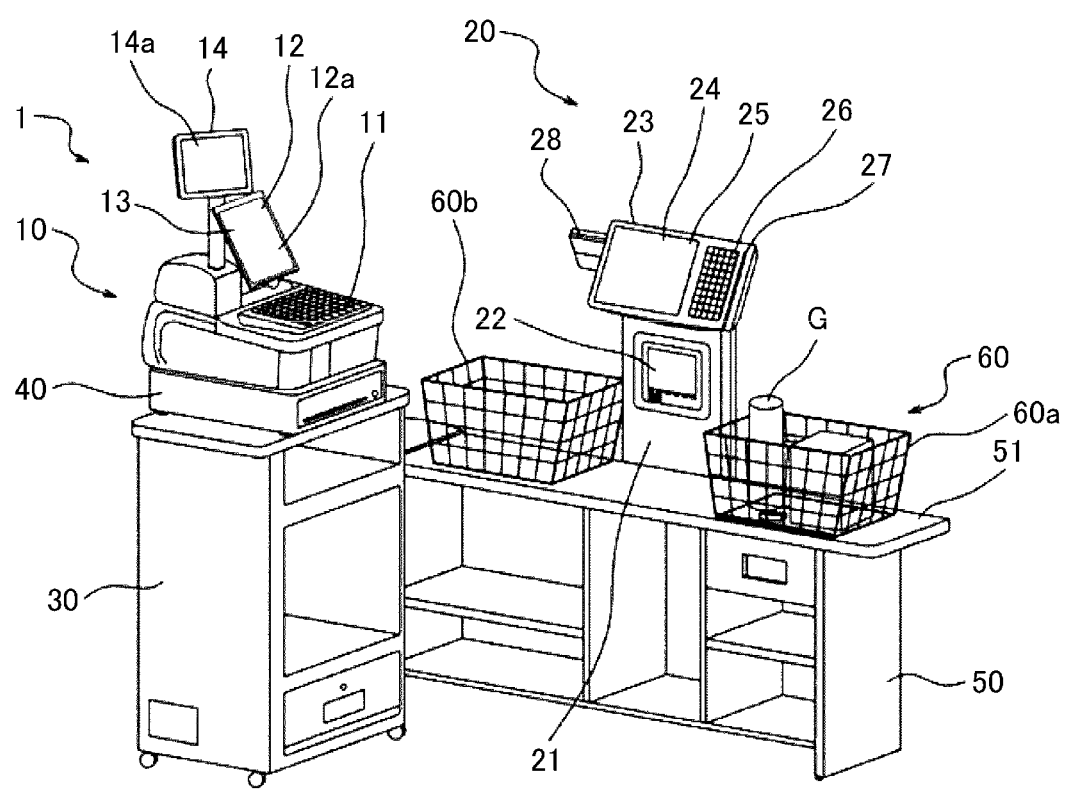
FIG. 1 is a perspective view of a check-out system according to an embodiment.

FIG. 1 is a perspective view of a check-out system 1 according to an embodiment. As illustrated in FIG. 1, the check-out system 1 includes a POS terminal 10 that registers products to be purchased and performs settlement processing of a purchase transaction and a merchandise reading apparatus 20 that reads information relating to the product to be purchased. Hereinafter, the POS terminal 10 is described as an example of an information processing apparatus according to the present embodiment.

The POS terminal 10 is mounted on an upper surface of a drawer 40 on a check-out table 30. The POS terminal 10 controls opening and closing of the drawer 40. A keyboard 11 that an operator (salesperson) can operate is disposed on the upper surface of the POS terminal 10. A first display device 12 that displays information to the operator is provided above the keyboard 11 seen by the operator who operates the keyboard 11. The first display device 12 displays information on a display surface 12a thereof. A touch panel 13 is stacked on the display surface 12a. A second display device 14 is rotatably provided above the first display device 12. The second display device 14 displays information on a display surface 14a thereof. In addition, the second display device 14 can display information to a customer when the display surface 14a is directed the depth direction of FIG. 1.

A long table-shaped counter table 50 is provided to form an L shape with the check-out table 30 on which the POS terminal 10 is mounted. The reception surface 51 is formed on the upper surface of the counter table 50. A shopping basket 60 that contains a product G can be placed on the reception surface 51. The shopping basket 60 includes a first shopping basket 60a that is carried by a customer and a second shopping basket 60b which is placed in a position so that the merchandise reading apparatus 20 is between the first shopping basket 60a and the second shipping basket 60b. In addition, the shopping basket 60 is not limited to a so-called basket shape, but may be a tray. In addition, the shopping basket 60 (second shopping basket 60b) is not limited to a so-called basket, but may be a box shape or a pouch shape.

The merchandise reading apparatus 20 is connected to the POS terminal 10 so that data communication may be performed and provided on the reception surface 51 of the counter table 50. The merchandise reading apparatus 20 includes a thin and rectangular housing 21. A reading window 22 is provided on the front surface of the housing 21. A displaying and operating unit 23 is mounted on the upper portion of the housing 21. The displaying and operating unit 23 includes a first display device 25 and a touch panel 24 stacked on the front surface of the first display device 24. A keyboard 26 is provided at a position to the right of the first display device 25. A card reading groove 27 of a card reader (not illustrated) is provided at a position to the right of the keyboard 26. A second display device 28 for providing information to a customer is provided on the rear surface of the displaying and operating unit 23 seen by the operator.

Figure 2:
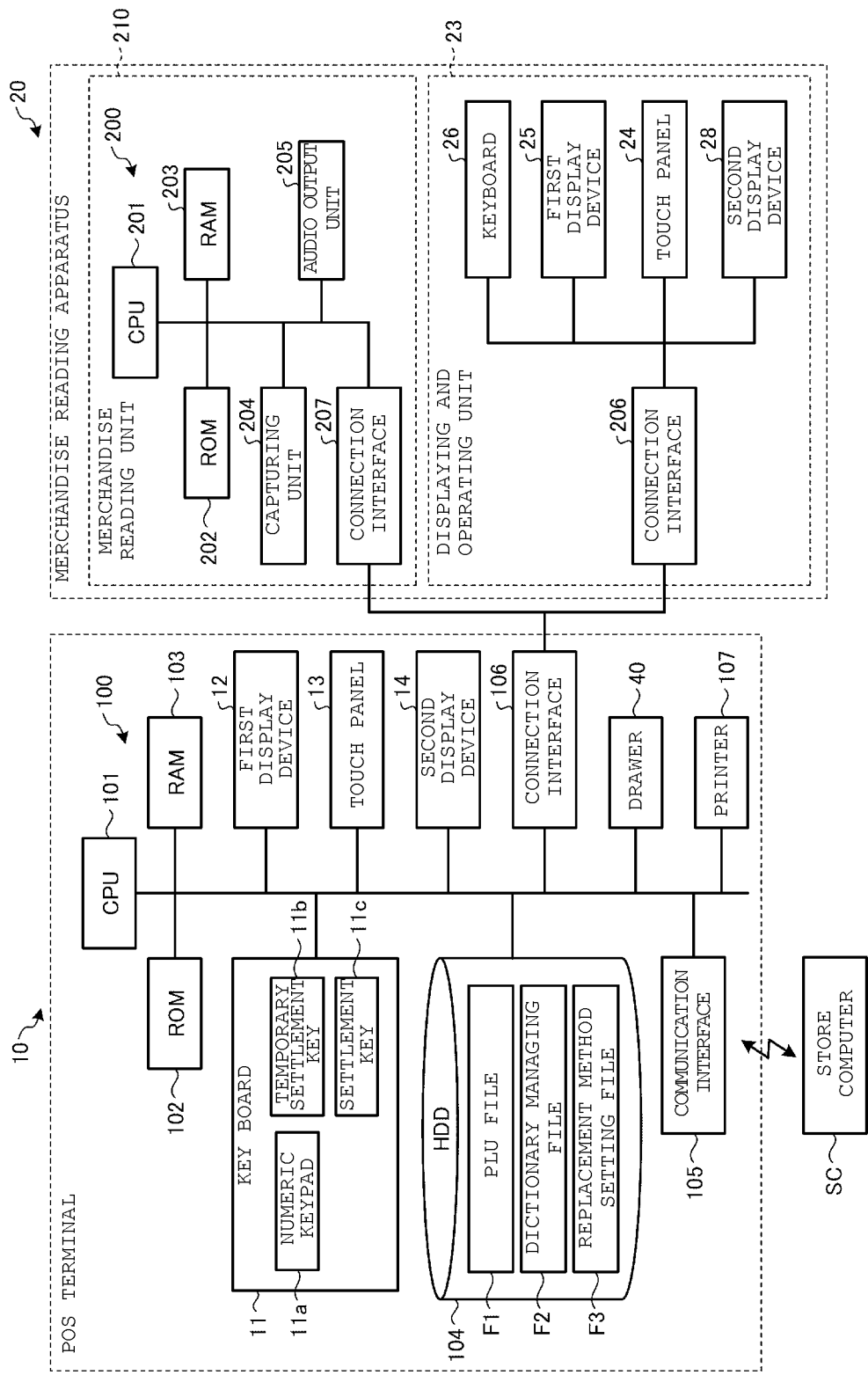
FIG. 2 is a block diagram of a point-of-sale (POS) terminal and a merchandise reading apparatus included in the check-out system.

The merchandise reading apparatus 20 includes a merchandise reading unit 210 (see FIG. 2). The merchandise reading unit 210 includes a capturing unit 204 (see FIG. 2) provided behind the reading window 22.

The product G to be purchased through a purchase transaction is placed in the first shopping basket 60a carried by a customer. The product G in the first shopping basket 60a is moved to the second shopping basket 60b by the operator who operates the merchandise reading apparatus 20. During the movement, the product G is moved to face the reading window 22 of the merchandise reading apparatus 20. At this point, the capturing unit 204 (see FIG. 2) provided in the reading window 22 captures an image of the product G.

The merchandise reading apparatus 20 causes the displaying and operating unit 23 to display a screen for selecting a product that corresponds to the product G to be purchased, from one or more products registered in a PLU file F1 (see FIG. 3). An image of the product G is captured by the capturing unit 204. Then, the merchandise reading apparatus 20 transmits a product ID of the selected product on the screen to the POS terminal 10. The POS terminal 10 performs sales registration by recording information relating to the sales registration such as a merchandise classification, a product name, or a price of the product corresponding to the product ID, in a sales master file (not illustrated), based on the product ID transmitted from the merchandise reading apparatus 20.

FIG. 2 is a block diagram of the POS terminal 10 and the merchandise reading apparatus 20. The POS terminal 10 includes a microcomputer 100 as an information processing unit that performs information processing. The microcomputer 100 includes a central processing unit (CPU) 101 that controls various calculation processing, and a read only memory (ROM) 102 and a random access memory (RAM) 103 connected to the central processing unit (CPU) 101 via buses.

The keyboard 11, the first display device 12, the touch panel 13, the second display device 14, and the drawer 40 are connected to the CPU 101 of the POS terminal 10 via various input output circuit (not illustrated) and controlled by the CPU 101.

The keyboard 11 includes a numeric keypad 11a, a temporary settlement key 11b, a settlement key 11c, or the like, which indicate numbers and arithmetic operators on upper surfaces thereof.

A hard disk drive (HDD) 104 is connected to the CPU 101 of the POS terminal 10. The HDD 104 stores programs or various files. All or part of the programs or the various files stored in the HDD 104 is copied to the RAM 103 and executed by the CPU 101, at the time of starting the POS terminal 10. Examples of the programs stored in the HDD 104 are programs for sales registration processing or dictionary registration processing (described below). In addition, examples of the files stored in the HDD 104 are the PLU file F1, a dictionary managing file F2, and a replacement method setting file F3.

The PLU file F1 is a merchandise file that stores information relating to sales registration of products sold in a store.

In the description below, the PLU file F1 is used as a dictionary, but the dictionary may be a file different from the PLU file F1. The dictionary stores feature data (feature value) with which captured image data of a product to be purchased is collated for identifying the product. If the dictionary is a file different from the PLU file F1, feature data (feature value) for collating stored in the dictionary and information (identification information) in the PLU file F1 may be associated with each other. The feature data include parameter values of the external appearance of the product, such as a contour, color tone on the surface, a pattern, or unevenness.

FIG. 3 illustrates a data configuration of the PLU file F1. As illustrated in FIG. 3, the PLU file F1 is a file that stores merchandise information, one or more illustration images, and feature data with respect to each product. The merchandise information includes a product ID, which is the identification information assigned uniquely to the product, merchandise classification to which the product belongs, a product name, and information relating to the product such as a unit price. The illustration image is image data of an image of the product, such as a picture or an illustration.

The feature data indicates characteristics of the external appearance of the product, such as color tone obtained from a captured image of the product, or unevenness of the surface of the product. The feature data is used for collating to determine similarity with a captured image of a product to be purchased. In addition, in the PLU file F1, it is assumed that a storage area may store (store) plural (for example, 2,000) items of feature data with respect to each registered product (product ID).

If species (cultivar or breed), of the product also has to be recognized (detected), information relating to the product such as product name or unit price, illustration image of the product, and the feature data are managed with respect to each of the species as illustrated in FIG. 3. For example, a category of a product (merchandise) is "YY", and information relating to the product, illustration image, and feature data are managed with respect to each of the species "YY_1", "YY_2", and "YY_3". Alternatively, a candidate product may be displayed by texts without using an illustration image, and in this case the illustration images of products may not be stored in the PLU file F1.

The dictionary managing file F2 is a file for storing update date and time, usage frequency, or the like of the feature data registered in the PLU file F1, which is dictionary.

FIG. 4 illustrates a data configuration of the dictionary managing file F2. As illustrated in FIG. 4, the dictionary managing file F2 stores a management number (code), an update date, and a usage frequency order with respect to each product ID.

Here, the management number is a number (code) for managing a storage region of the PLU file F1 secured to register (store) the feature data of the corresponding product (product ID). For example, if 2,000 storage regions to register 2,000 items of feature data are prepared, the management numbers from "1" to "2,000" are assigned to the storage regions in an ascending order.

The update date is date and time when the feature data has been registered or date and time when the registered feature data has been updated to new feature data, with respect to the storage region of the corresponding management number. An order of the usage frequency of the feature data stored in the corresponding storage region is stored in the usage frequency order.

The replacement method setting file F3 stores a plurality of methods for replacing the existing feature data registered in the PLU file F1 with new feature data.

FIG. 5 illustrates a data configuration of the replacement method setting file F3. As illustrated in FIG. 5, the replacement method setting file F3 stores a replacement method ID with respect to each product ID. Here, in the replacement method, replacement method type of the method for replacing the existing feature data registered in the PLU file F1 with newly registered feature data is stored. In FIG. 5, three replacement method types (first, second, and third) are stored. In addition, the replacement method setting file F3 of FIG. 5 stores the replacement method type with respect to each product (product ID), but the invention is not limited thereto. For example, the replacement method setting file F3 may stores the replacement method type with respect to each of species of a product.

With reference to FIG. 2, a communication interface 105 for performing data communication with a store computer SC is connected to the CPU 101 of the POS terminal 10 via an input output circuit (not illustrated). The store computer SC is located in a back office of the store or the like. The PLU file F1 is stored in an HDD (not illustrated) of the store computer SC and transmitted to the POS terminal 10 therefrom.

Further, a connection interface 106 that is configured to communicate with the merchandise reading apparatus 20 is connected to the CPU 101 of the POS terminal 10. The merchandise reading apparatus 20 is connected to the connection interface 106. In addition, a printer 107 that performs printing on a receipt or the like is connected to the CPU 101 of the POS terminal 10. The printer 107 prints transaction content of a purchase transaction on the receipt under the control of the CPU 101.

The merchandise reading apparatus 20 also includes a microcomputer 200. The microcomputer 200 includes a CPU 201 and a ROM 202 and a RAM 203, which are connected to the CPU 201 via a bus. Programs executed by the CPU 201 are stored in the ROM 202. The capturing unit 204 and an audio output unit 205 are connected to the CPU 201 via various kinds of input output circuits (not illustrated). The operations of the capturing unit 204 and the audio output unit 205 are controlled by the CPU 201.

The displaying and operating unit 23 is connected to the merchandise reading unit 210 and the POS terminal 10 via a connection interface 206. The operation of the displaying and operating unit 23 is controlled by the CPU 201 of the merchandise reading unit 210 and the CPU 101 of the POS terminal 10. Here, the first display device 25 displays various screens such as a merchandise candidate screen (see FIG. 6) under the control of the CPU 101 or the CPU 201. The first display device also displays an operation selection screen (not illustrated) for selecting one of various operations. The operation selection screen has, for example, a selection menu for selecting one of a plurality of selectable items each of which represents an operation, such as sales registration or dictionary registration.

The capturing unit 204 is an image capturing device such as a color CCD image sensor or a color CMOS image sensor. The capturing unit 204 performs image capturing through the reading window 22 under the control of the CPU 201. For example, the capturing unit 204 captures a moving image at 30 fps. The images (frame images) sequentially captured at a predetermined frame rate by the capturing unit 204 are stored in the RAM 203.

The audio output unit 205 is an audio circuit, a speaker, or the like for generating an alarm sound or the like which is set in advance. The audio output unit 205 performs notification by an alarm sound or a voice under the control of the CPU 201.

Further, a connection interface 207, which is connected to the connection interface 106 of the POS terminal 10, is connected to the CPU 201. The connection interface 207 enables a data communication with the POS terminal 10. In addition, the CPU 201 performs data communication with the displaying and operating unit 23 via the connection interface 207.

Next, the functional configuration of the POS terminal 10, which is achieved by the CPU 101 executing a program, is described with reference to FIG. 6.

Figure 6:
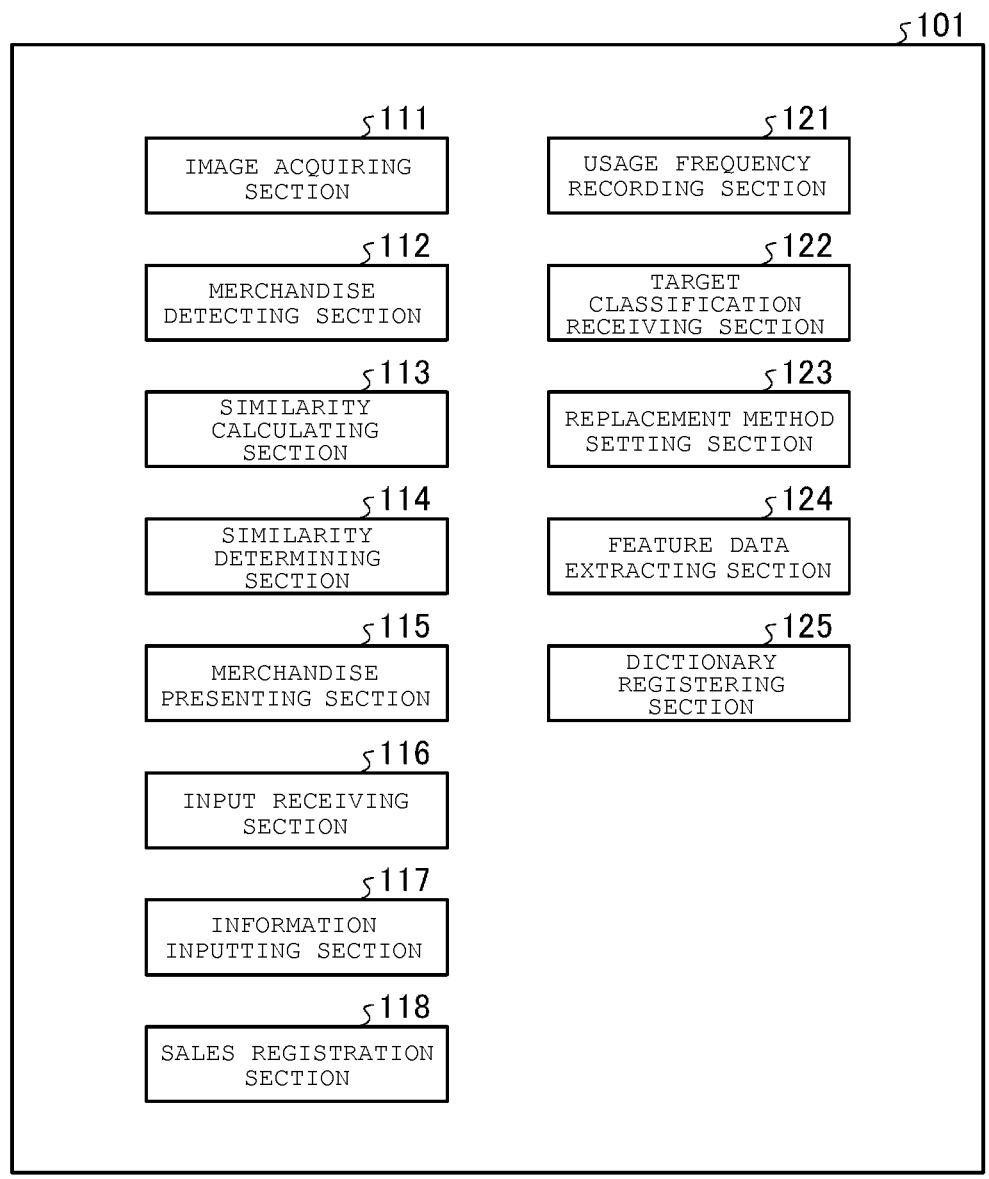
FIG. 6 is a block diagram illustrating a functional configuration of the POS terminal.

FIG. 6 is a block diagram illustrating a functional configuration of the POS terminal 10. As illustrated in FIG. 6, the CPU 101 of the POS terminal 10 has an image acquiring section 111, a merchandise detecting section 112, a similarity calculating section 113, a similarity determining section 114, a merchandise presenting section 115, an input receiving section 116, an information inputting section 117, a sales registration section 118, a usage frequency recording section 121, a target classification receiving section 122, a replacement method setting section 123, a feature data extracting section 124, and a dictionary registering section 125. These functional sections are generated when the CPU 101 executes programs stored in the HDD 104. Hereinafter, respective functional sections are described.

First, the image acquiring section 111, the merchandise detecting section 112, the similarity calculating section 113, the similarity determining section 114, the merchandise presenting section 115, the input receiving section 116, the information inputting section 117, and the sales registration section 118, which relate to the sales registration of products, are described.

The image acquiring section 111 causes the capturing unit 204 to start an image capturing operation by outputting a capturing-on signal to the capturing unit 204. The image acquiring section 111 sequentially acquires images captured by the capturing unit 204 and stored in the RAM 203 when the image capturing operation is started. The images are acquired by the image acquiring section 111 in the sequence same as the sequence stored in the RAM 203.

Figure 7:
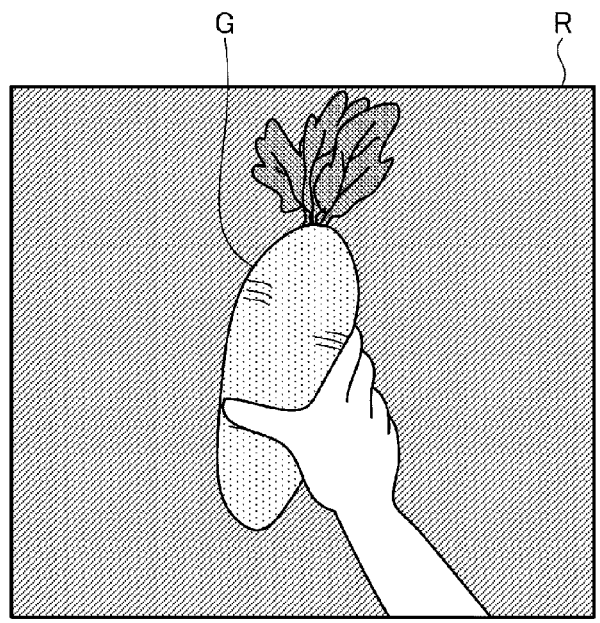
FIG. 7 illustrates an example of an image acquired by an image acquiring section of the POS terminal.

FIG. 7 illustrates an example of an image acquired by the image acquiring section 111. As illustrated in FIG. 7, if the operator holds the product G near the reading window 22, all or part of the product G within an image capturing area R of the capturing unit 204 is captured by the capturing unit 204.

The image acquiring section 111 sequentially acquires the images captured by the capturing unit 204.

The merchandise detecting section 112 detects all or part of the product G included in the images acquired by the image acquiring section 111, by using a pattern matching technique or the like. Specifically, outlines or the like of the product G is extracted from binarized images of the captured images. Then, an outline extracted from a previously-detected image and an outline extracted from a currently-detected image are compared with each other to identify the product G for sales registration.

When a hand of the operator holding the product G is within the image capturing area, another method for identifying the product may be employed. First, a human body is detected from the acquired image based on a color, an outline, or the like. If the human skin color is detected, that is, a hand of the operator (salesperson) is detected, the outline near the human skin colored area is detected. Then, the outline of the product G grabbed by the hand of the operator is extracted. At this point, if an outline of an object is detected near the outline of the hand, the product G may be detected from the outline of the object.

The similarity calculating section 113 extracts the surface condition such as color tone or unevenness of the product G as the feature data from all or part of the image of the product G captured by the capturing unit 204. Here, the similarity calculating section 113 does not consider the outline or the size of the product G in order to reduce the processing time.

Then, the similarity calculating section 113 compares the feature data of products (registered products) subjected to the dictionary registration in the PLU file F1 and the feature data of the product G, and calculates a similarity value between the product G and the registered products. Here, the image of the registered product is set to 100% (i.e., similarity value is 1.0, and the similarity value indicates how much the captured image of the product G is similar to the registered product.

Specifically, the similarity calculating section 113 calculates the similarity value by comparing feature data of products registered in the PLU file F1 and the feature data of one or more captured images of the product G with respect to each registered product. Here, for example, the similarity calculating section 113 uses a highest similarity value among the calculated similarity values as the similarity value of the product. Then, the similarity calculating section 113 determines one or more registered products that have a similarity value greater than a predetermined value to be candidates of the product G. The method to determine the candidate products is not limited to the above examples. In addition, the similarity value may be calculated by putting different weight on the color tone and the unevenness of the products.

In this manner, recognition of an object contained in the image is called generic object recognition. With respect to the generic object recognition, various recognition techniques are described in a reference below.

"The Current State and Future Directions on Generic Object Recognition" by Kenji Yanai, Information Processing Society of Japan, Vol. 48, No. SIG16 [searched on May 19, 2012], Internet <URL: http://mm.cs.uec.ac.jp/IPSJ-TC-VIM-Yanai.pdf>

In addition, a technique of performing the generic object recognition by dividing an image with respect to each object is described in a reference below.

"Semantic Texton Forests for Image Categorization and Segmentation" by Jamie Shotton et al., [searched on May 19, 2012], Internet <URL: http://citeseerx.ist.psu.edu/viewdoc/download?doi=10.1.1.1 45.3036&rep=rep1&type=pdf>

In addition, the calculation method of the similarity value between the captured image of the product G and the registered product is not particularly limited. For example, the similarity value between the captured image of the product G and the respective registered products may be calculated by either absolute evaluation or relative evaluation.

If the similarity value is calculated by absolute evaluation, the captured image of the product G and the respective images of the registered products are compared one by one, and the similarity value derived as a result of the comparison may be employed as it is. Alternatively, if the similarity value is calculated by relative evaluation, a total of the similarity values of the product G and the respective registered products may be calculated to be 1.0 (100%).

In addition, the similarity value may be a value calculated by comparing the feature data of the product G and the feature data of the products registered in the PLU file F1 and indicate how much the feature data of two products are similar. Alternatively, the similarity value is not limited to the example above, and may be a value indicating coincidence with the feature data of the products registered in the PLU file F1 or a value indicating how much the feature data of the product G and the feature data of the respective registered products registered in the PLU file F1 correlate.

The similarity determining section 114 recognizes, as the candidate (candidate product) of the product G captured by the capturing unit 204, the registered products (product IDs) that have the similarity value greater than a predetermined threshold value. Here, when there is only one registered product that has the similarity value that is largely greater than the other registered products that have similarity values greater than the threshold value, the registered product may be automatically determined as the product G. Here, the comparison standard of the similarity value may be arbitrarily set.

The merchandise presenting section 115 displays the information relating to the candidate products determined by the similarity determining section 114 on the first display device 25. Specifically, the merchandise presenting section 115 reads the record of the candidate products from the PLU file F1, and displays images of the candidate products on a candidate screen of the first display device 25.

Figure 8:
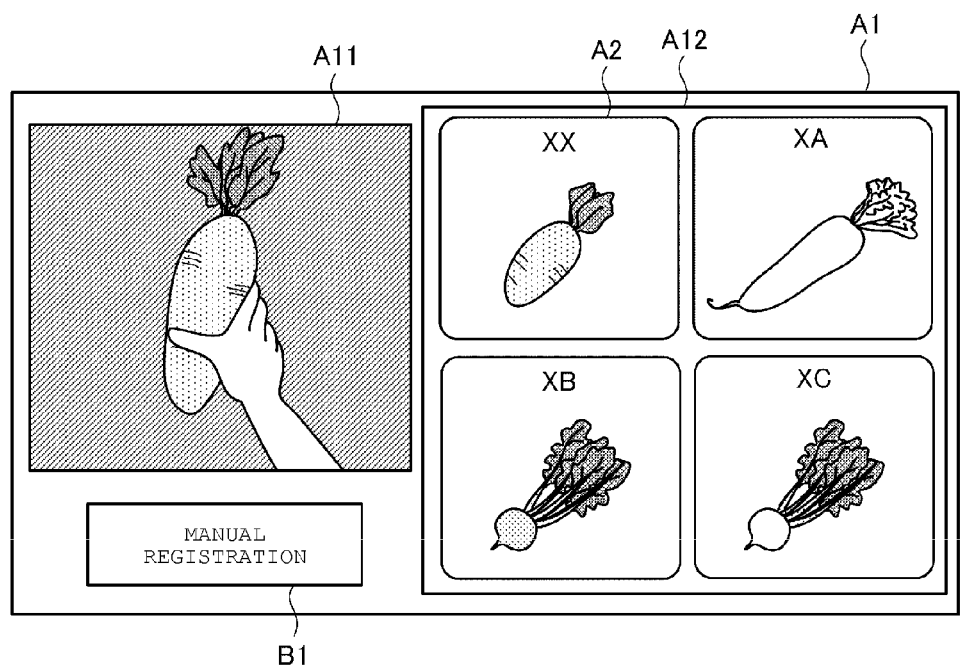
FIG. 8 illustrates an example of a candidate product screen displayed on a display device of the merchandise reading apparatus.

FIG. 8 illustrates an example of the candidate screen. As illustrated in FIG. 8, a candidate screen A1 displayed in the first display device 25 includes a captured image region A11 and a candidate product region A12.

The captured image region A11 is a region for displaying a captured image of the product G acquired by the image acquiring section 111. A manual registration button B1 is displayed below the captured image region A11, and the manual registration button B1 is used for manually registering the product G from a section code, a product list, or the like. The CPU 201 displays a manual registration screen (not illustrated) for manually registering the product Gin response to the operation of the manual registration button B1 on the first display device 25. In addition, the product registered through the manual registration screen is treated as the settled product.

The candidate product region A12 is a region for displaying the information relating to the candidate products. A plurality of display regions A2 is arranged in the candidate product region A12. In FIG. 8, four displaying regions A2 are arranged in the candidate product region A12, but the number of the display regions A2 is not particularly limited. The merchandise presenting section 115 arranges and displays images of the candidate products and product information (product name, such as XX, XA, or the like) of the candidate products on the displaying regions A2. In addition, the candidate product displayed on the candidate product region A12 is selectable on the touch panel 24. According to such a configuration, the operator of the merchandise reading apparatus 20 may select a candidate product corresponding to the product G among the candidate products displayed on the candidate product region A12, as the settled product.

The input receiving section 116 receives various input operations corresponding to the display of the first display device 25 via the touch panel 24 or the keyboard 26. For example, the input receiving section 116 receives selection operation of a candidate product corresponding to the product G among the displayed candidate products.

The information inputting section 117 inputs information corresponding to the operation received by the input receiving section 116 in the POS terminal 10. For example, the information inputting section 117 inputs information (for example, a product ID or product name) about the settled product. In addition, the information inputting section 117 may input the number of products to be sold, which is separately input via the touch panel 24 or the keyboard 26, together with the product ID or the like.

The sales registration section 118 performs sales registration of the corresponding product based on the product ID and the number of products to be sold, which are input by the information inputting section 117. Specifically, the sales registration section 118 records the product classification, the product name, the unit price of the product ID, the product ID, and the number of products to be sold in a sales master file with reference to the PLU file F1, and performs sales registration.

Next, the functional configuration relating to the dictionary registration is described.

As described above, the POS terminal 10 performs the generic object recognition for identifying a product according to the similarity between the feature data of the product extracted from the image data captured by the capturing unit 204 and the feature data of products subjected to the dictionary registration. Accuracy of the generic object recognition depends on accuracy of the feature data of products subjected to the dictionary registration. The feature data of a registered product is extracted from an image of the product in the same manner as in the image capturing of the product to be sold.

In order to improve the recognition accuracy, it is preferable to add new feature data of the product that has high similarity to the product that is actually to be sold in the dictionary. This process is called a learning process. In this case, since the number of feature data units that may be registered in the dictionary is limited, when there is no empty area in the dictionary, a previously registered feature data may have to be replaced with the new feature data. However, since there is a product of which the appearance changes depending on seasons, if the feature data of the product is randomly replaced, the recognition accuracy may decrease.

According to the present embodiment, the POS terminal 10 is capable of setting the method to replace the registered feature data with the new feature data in the PLU file F1 with respect to each product (product ID). Specifically, the CPU 101 of the POS terminal 10 generates the usage frequency recording section 121, the target classification receiving section 122, the replacement method setting section 123, the feature data extracting section 124, and the dictionary registering section 125 as functional sections relating to the dictionary registration by executing programs stored in the HDD 104 as illustrated in FIG. 4.

Figure 9:
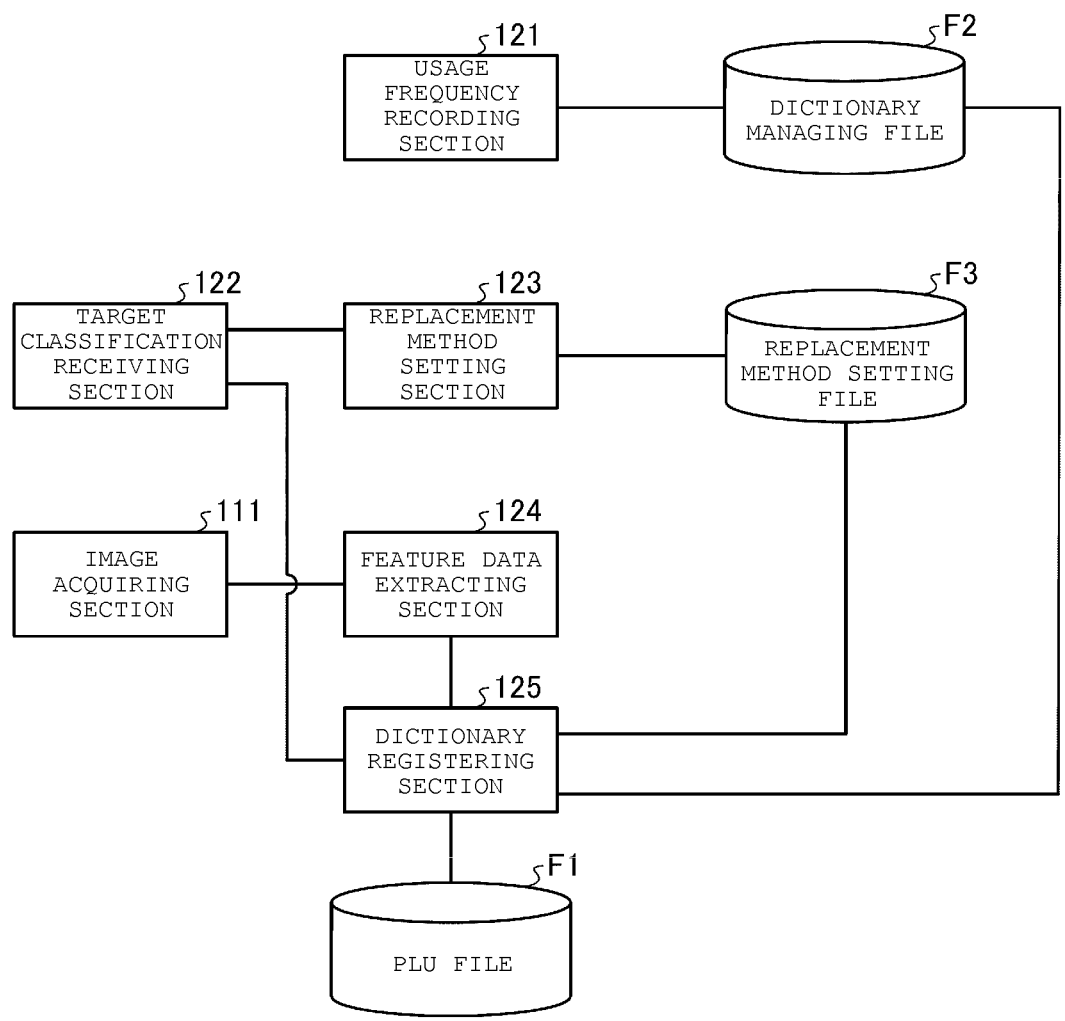
FIG. 9 is a block diagram illustrating functional sections of the POS terminal related to a dictionary registration.

FIG. 9 illustrates the functional sections related to the dictionary registration illustrated in FIG. 6. Here, the image acquiring section 111 is not illustrated since the image acquiring section 111 is the same as the functional section relating to the sales registration described above. In addition, for the operation of the touch panel 24 or the keyboard 26, sections such as the input receiving section 116 and the information inputting section 117 described above are used.

The usage frequency recording section 121 records usage frequency of the feature data registered in the PLU file F1 by cooperating with the similarity calculating section 113. Here, the standard to determine that the feature data is "used" is not particularly limited, and various standards may be employed. For example, if a feature data unit has been used to calculate the similarity value (i.e., has a highest similarity value) with the feature data of the product to be sold, it may be determined that the feature data unit is "used." Alternatively, if a feature data unit has been used to calculate the similarity value and as a result the corresponding product is determined as the candidate product or the settled product, it may be determined that the feature data unit is "used."

In addition, the usage frequency recording section 121 aggregates the number of the usage of each feature data unit or the usage frequency of each feature data unit with respect to each registered product (product ID). Also, the usage frequency recording section 121 registers the aggregation result of each feature data unit to the usage frequency order list associated with the product ID in the dictionary managing file F2 together with the management number of the feature data unit.

Here, the feature data units are listed in the dictionary managing file F2 of FIG. 4 according to the usage frequency rank, but the feature data units may be listed according to other criteria. For example, the feature data units may be listed according to the number of usage. In addition, if the usage of the feature data unit is updated, the usage frequency (rank) of the feature data units is reset.

The target classification receiving section 122 receives an input of a target object (target product) of the dictionary registration. Specifically, the target classification receiving section 122 receives an input of a product ID of the target product when new feature data unit is registered to the PLU file F1. In addition, the target classification receiving section 122 may operate to display an operation screen for promoting the input or the selection of the product ID on the first display device 25 or the like.

The replacement method setting section 123 is a functional section that sets the replacement method of replacing the existing feature data unit registered in the dictionary managing file F2 with new feature data unit. Here, the replacement method may be one of three methods described below.

The first replacement method is a method of replacing feature data unit that has an oldest update date first. The first replacement method is preferably applied, for example, to products of which external appearance may change according to seasons in a year, such as fruits, vegetables, and the like. Since the feature data unit registered in a season different from the current season is replaced first and the feature data appropriate for the current season may be used for the recognition, the recognition accuracy may be improved.

The second replacement method is a method of replacing the feature data units randomly. The second replacement method is preferably applied, for example, to products of which feature data units are substantially equally used. With this method as well, the recognition accuracy may be improved by using newly registered feature data unit.

The third replacement method is a method of replacing a feature data unit that has a lowest usage frequency first. The third replacement method is preferably applied to products of which the external appearance is stable throughout a year. Since the feature data unit having a lowest usage frequency is replaced first and the new feature data unit may be used for the recognition, the recognition accuracy may be improved.

The replacement method setting section 123 sets any of the three replacement methods to the replacement method setting file F3 in association with the product ID of the target product. In addition, the replacement method setting section 123 may operate to display an operation screen for promoting selection of the replacement method on the first display device 25 or the like. In addition, in the present embodiment, the replacement method is set with respect to each product ID. Alternatively, the replacement method may be set with respect to each of species of a product or each product name.

The feature data extracting section 124 is a functional section that extracts the feature data from the image acquired by the image acquiring section 111. Specifically, the feature data extracting section 124 extracts values representing the external appearance of the product, such as the shape, the color tone of the surface, the pattern, the unevenness, and the like from an image of the product, as a feature data unit.

The dictionary registering section 125 registers the feature data unit extracted by the feature data extracting section 124 in the PLU file F1, which is the dictionary, in association with the product ID of the target product. Here, if there is a space (empty area) in the storage region for the product ID, the dictionary registering section 125 registers the feature data unit extracted by the feature data extracting section 124 to the empty area of the storage region. In addition, if the storage region is full, the dictionary registering section 125 replaces the registered feature data unit by using the replacement method set for the target product (product ID) in the replacement method setting file F3.

For example, if the first replacement method is set for the target product, the dictionary registering section 125 selects one feature data unit having the oldest update date among the plurality of feature data units registered in association with the product ID of the product. Then, in the storage region in which the selected feature data unit is stored, the dictionary registering section 125 replaces data by overwriting the feature data extracted by the feature data extracting section 124.

If the second replacement method is set for the product, the dictionary registering section 125 randomly selects one feature data unit among the feature data units registered in association with the product ID of the product. Then, in the storage region in which the selected feature data unit is stored, the dictionary registering section 125 replaces the data by overwriting the feature data unit extracted by the feature data extracting section 124.

If the third replacement method is set for the product, the dictionary registering section 125 selects one feature data unit having the lowest usage frequency among the feature data units registered in association with the product ID of the product. Then, in the storage area in which the selected feature data unit is stored, the dictionary registering section 125 replaces data by overwriting the feature data unit extracted by the feature data extracting section 124.

In addition, when the registration or the replacement of the feature data is performed in the storage region, the dictionary registering section 125 updates the update date by registering the current date and time in the dictionary managing file F2.

Figure 10:
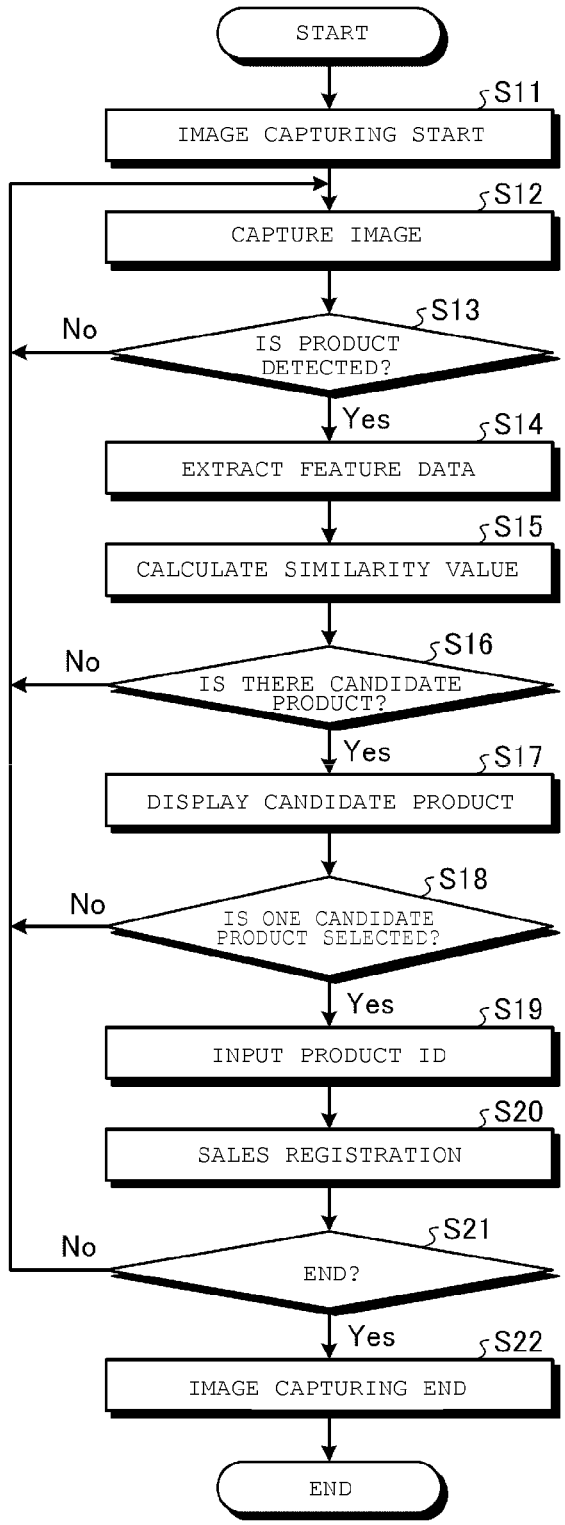
FIG. 10 is a flowchart of sales registration processing performed by the POS terminal according to the embodiment.

Hereinafter, the operation of the check-out system 1 is described. First, with reference to FIG. 10, the sales registration processing of a product to be sold (product G) is described. Here, FIG. 10 is a flowchart of the sales registration processing performed by the POS terminal 10 according to the present embodiment.

If the "sales registration" is selected through the operation selection screen (not illustrated) displayed on the first display device 12, the CPU 101 of the POS terminal 10 starts the sales registration processing. First, the image acquiring section 111 causes the image capturing operation to be started by outputting the capturing-on signal to the capturing unit 204 (Step S11). Then, the image acquiring section 111 acquires the image captured by the capturing unit 204 and stores the captured image in the RAM 203 (Step S12).

Then, the merchandise detecting section 112 detects all or part of the product G from the image acquired in Step S12 (Step S13). In Step S13, if the product G is not detected (Step S13; No), the process returns to Step S12. If the product G is detected (Step S13; Yes), the similarity calculating section 113 extracts the feature data of the product G detected in Step S13 from the image acquired in Step S12 (Step S14).

Then, the similarity calculating section 113 compares the feature data extracted in Step S14 and the feature data of each product registered in the PLU file F1 and calculates similarities, respectively (Step S15). The similarity determining section 114 determines whether there are one or more registered products having the similarity value that is equal to or greater than a predetermined threshold value (Step S16). Here, if there is no registered product having the similarity value that is equal to or greater than the predetermined threshold value (Step S16; No), the process returns to Step S12. In addition, if there is one or more registered products having the similarity value that is equal to or greater than the predetermined threshold value (Step S16; Yes), the similarity determining section 114 determines these registered products (product IDs) as the candidate products. In addition, the usage frequency recording section 121 adds up the number of the usage (usage frequency) of the feature data unit used by the similarity determining section 114 in Step S15 and S16 to the dictionary managing file F2.

The merchandise presenting section 115 operated to display the candidate products determined in Step S16 on the first display device 25 (Step S17). Then, the input receiving section 116 determines whether selection of a candidate product is received via the touch panel 24 or the keyboard 26 (Step S18). Here, if the selection operation of the candidate product is not received (Step S18; No), the process returns to Step S12.

If the selection operation of the candidate product is received (Step S18; Yes), the information inputting section 117 inputs the information of the product ID of the settled product or the like in the POS terminal 10 (Step S19), and the process proceeds to Step S20. Here, if the number of the product is separately input via the touch panel 24 or the keyboard 26, the number of the product is also input in the POS terminal 10 together with the information of the settled product. In addition, if the number of the product is not input, the number of product may be automatically set to "1" as a default value.

Then, the sales registration section 118 reads the product information such as the product classification or the unit price from the PLU file F1 based on the merchandise ID and the number of sales input in Step S19 and registers such data in the sales master file (Step S20).

Then, the CPU 101 determines whether the sales registration is terminated by an operation instruction of the keyboard 11 or the like (Step S21). If the sales registration is continued (Step S21; No), the process returns to Step S12. If the sales registration is terminated (Step S21; Yes), the image acquiring section 111 causes the capturing unit 204 to end the image capturing by outputting a capturing-off signal to the capturing unit 204 (Step S22), and the process ends.

Figure 11:
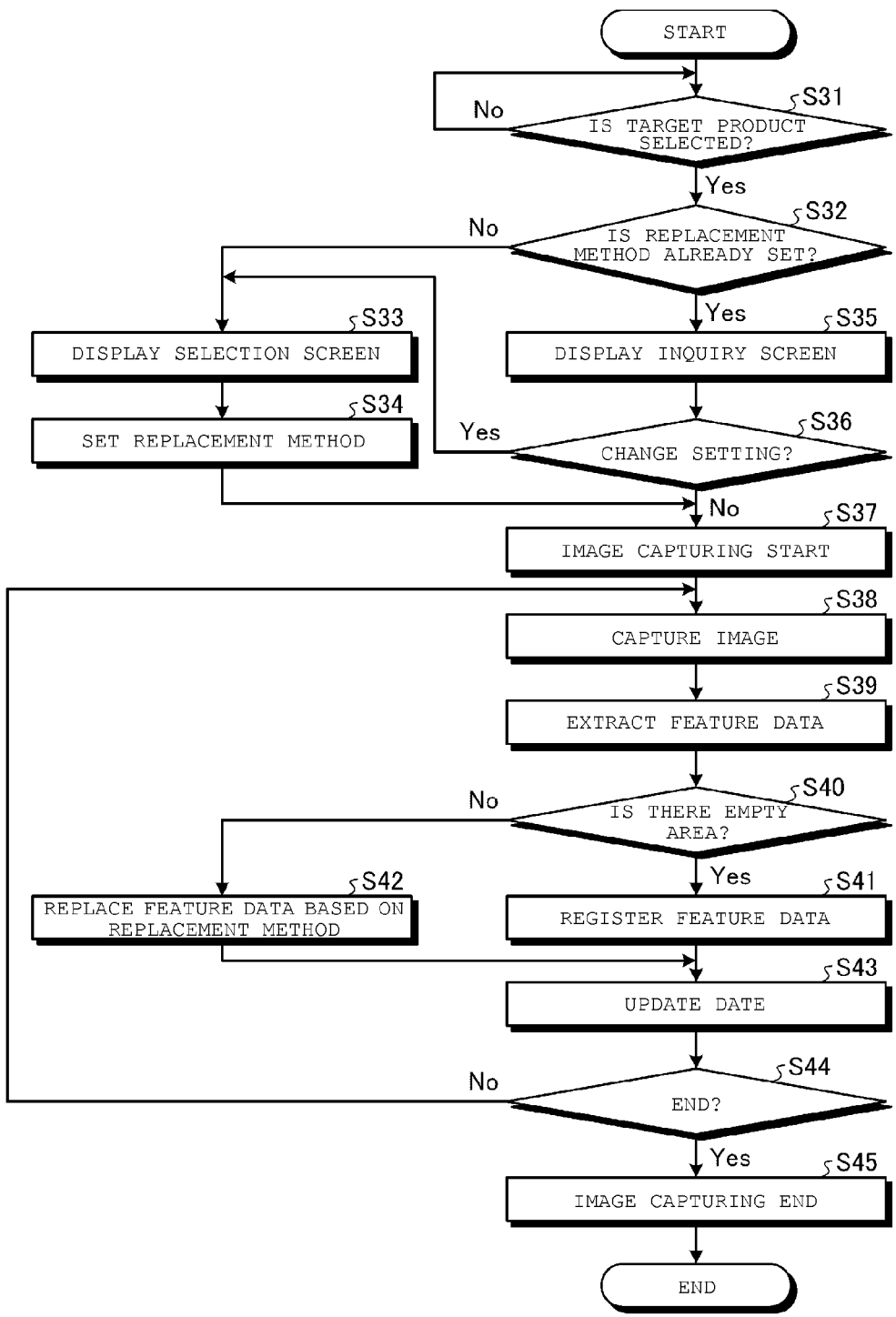
FIG. 11 is a flowchart of dictionary registration processing performed by the POS terminal according to the embodiment.

Next, with reference to FIG. 11, the dictionary registration processing of a product is described. Here, FIG. 11 is a flowchart of the dictionary registration processing performed by the POS terminal 10 according to the present embodiment.

If the "dictionary registration" is selected through the operation selection screen (not illustrated) displayed on the first display device 25, the CPU 101 of the POS terminal 10 starts the dictionary registration processing. First, the target classification receiving section 122 stands by until a product ID of a target product is selected (input) (Step S31; No).

If the product ID of the target product is selected (Step S31; Yes), the replacement method setting section 123 refers to the replacement method setting file F3 and determines whether the replacement method has been already set with respect to the input product ID (Step S32). If it is determined that the setting has not been performed (Step S32; No), the replacement method setting section 123 displays the selection screen for selecting one of the first to third replacement methods on the first display device 25 (Step S33). If the replacement method setting section 123 receives selection of one of the replacement methods, the selected method is set in the replacement method setting file F3 in association with the product ID of the target product (Step S34).

If it is determined that the replacement method has been already set (Step S32; Yes), the replacement method setting section 123 displays an inquiry screen for asking the operator whether the operator wants to change the setting on the first display device 25 (Step S35). In addition, details of the replacement method currently set is preferably displayed on the inquiry screen.

Here, if it is determined that the setting change is instructed (Step S36; Yes), the process proceeds to Step S33 and the replacement method setting section 123 prompts the operator to select the replacement method. In addition, if the setting change is not instructed (Step S36; No), the process proceeds to Step S37.

Then, the image acquiring section 111 causes the image capturing operation to be started by outputting the capturing-on signal to the capturing unit 204 (Step S37). Then, the image acquiring portion 111 acquires the image captured by the capturing unit 204 and stored in the RAM 203 (Step S38). Then, the feature data extracting section 124 extracts the feature data of the target product from the image acquired in Step S38 (Step S39).

The dictionary registering section 125 determines whether there is an empty area for storing the feature data extracted in Step S39 for the target product (product ID) in the storage region prepared in the PLU file F1 (Step S40). Here, if it is determined that there is an empty area (Step S40; Yes), the dictionary registering section 125 registers the feature data extracted in Step S39 to the empty area (Step S41).

If it is determined that there is no empty area (Step S40; No), the dictionary registering section 125 reads the replacement method of the target product (product ID) set in the replacement method setting file F3. Then, the dictionary registering section 125 replaces the existing feature data registered in the PLU file F1 in association with the product ID of the target product, which is determined in accordance with the read replacement method, with the feature data extracted in Step S39 (Step S42).

Then, the dictionary registering section 125 refers to the dictionary managing file F2 and updates the update date of the storage region in which the feature data is registered or replaced (Step S43).

Then, the CPU 101 determines whether the dictionary registration is terminated by an operation instruction of the keyboard 11 (Step S44). If the dictionary registration continues (Step S44; No), the process returns to Step S38 and the CPU 101 continues the process. If the dictionary registration is terminated (Step S44; Yes), the image acquiring section 111 ends the image capturing by the capturing unit 204 by outputting the capturing-off signal to the capturing unit 204 (Step S45), and the process ends.

As described above, the POS terminal 10 of the present embodiment replaces the existing feature data registered in the dictionary with new feature data using the replacement method set with respect to each product (product ID). Since the dictionary registration may be performed using the replacement method appropriate for the product, the recognition accuracy may be improved.

While certain embodiments have been described, these embodiments have been presented by way of example only, and are not intended to limit the scope of the inventions. Indeed, the novel embodiments described herein may be embodied in a variety of other forms; furthermore, various omissions, substitutions, changes, and addition in the form of the embodiments described herein may be made without departing from the spirit of the inventions. The accompanying claims and their equivalents are intended to cover such forms or modifications as would fall within the scope and spirit of the inventions.

For example, in the above embodiment, the POS terminal 10 includes the PLU file F1, the dictionary managing file F2, and the replacement method setting file F3, but the present disclosure is not limited thereto. For example, the merchandise reading apparatus 20 may include the respective files, or an external device to which the POS terminal 10 and the merchandise reading apparatus 20 can access may include the respective files.

In addition, in the above embodiment, the dictionary registration is performed by the merchandise reading apparatus 20, but the present disclosure is not limited thereto. For example, the dictionary registration may be performed by the POS terminal 10.

In addition, in the dictionary registration processing of the above embodiment, whether the replacement method has been already set is determined before the dictionary registration, but the present disclosure is not limited thereto. For example, whether the replacement method has been already set may be determined after it is determined that there is no empty area in the PLU file F1. In addition, the timing for performing the dictionary registration processing is not particularly limited. For example, the dictionary registration processing may be performed during the sales registration processing. If the dictionary registration processing is performed during the sales registration processing, the product ID input in Step S19 may be a product ID of the target product for the dictionary registration.

In addition, in the above embodiment, the POS terminal 10 is applied as an example of an information processing apparatus having functions of the usage frequency recording section 121, the target classification receiving section 122, the replacement method setting section 123, the feature data extracting section 124, and the dictionary registering section 125, but the present disclosure is not limited thereto. For example, the merchandise reading apparatus 20 may be applied as the information processing apparatus.

In addition, according to the above embodiment, the check-out system 1 that includes the POS terminal 10 and the merchandise reading apparatus 20 is applied as the store system, but the present disclosure is not limited thereto. For example, the check-out system 1 may be one device having functions of the POS terminal 10 and the merchandise reading apparatus 20. An example of the device including the functions of the POS terminal 10 and the merchandise reading apparatus 20 is a self-check-out device (hereinafter, referred to as a self-POS terminal) which is installed and used in a store such as a supermarket.

Figure 12:
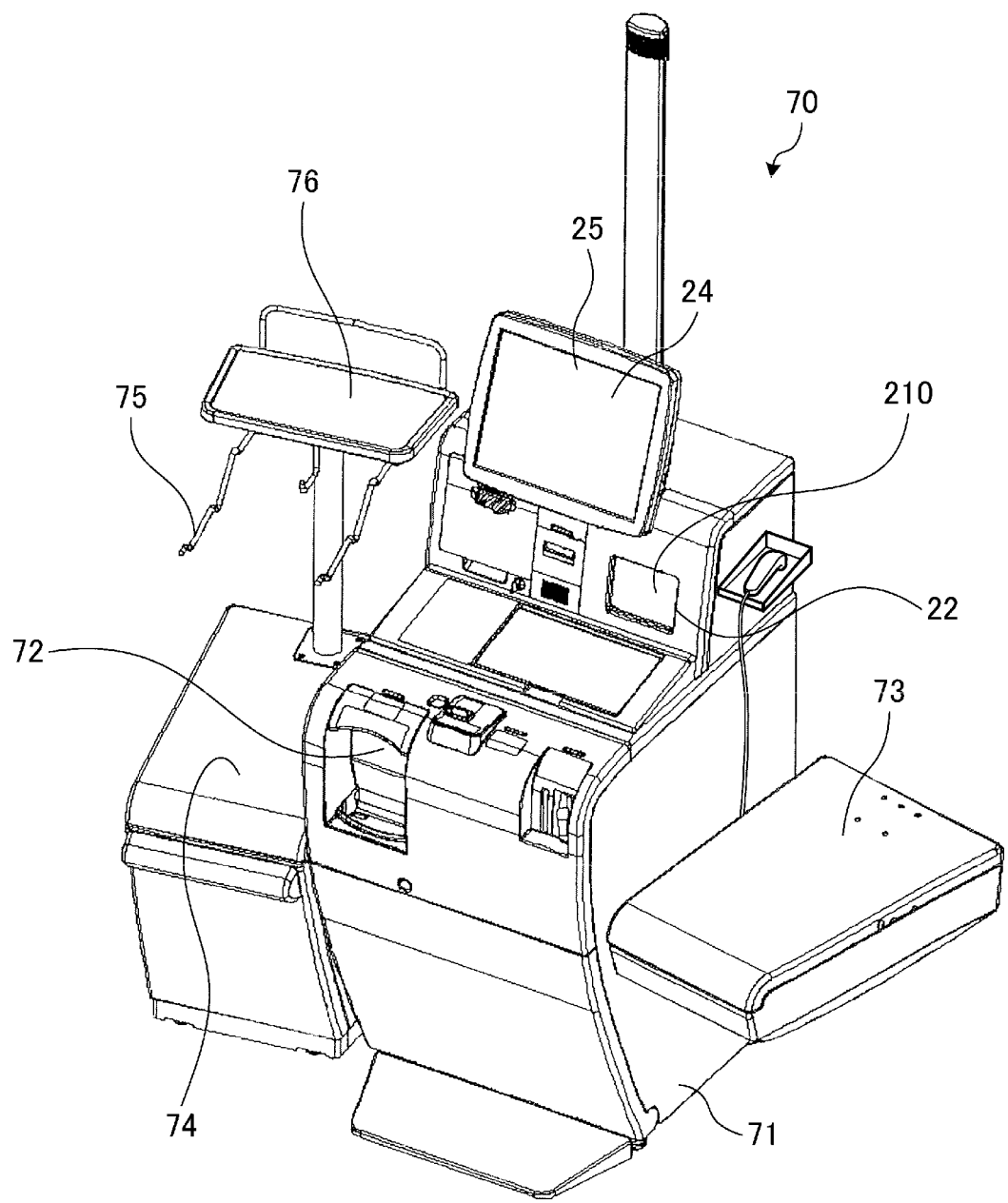
FIG. 12 is a perspective view of a self-POS terminal according to an embodiment.
Figure 13:
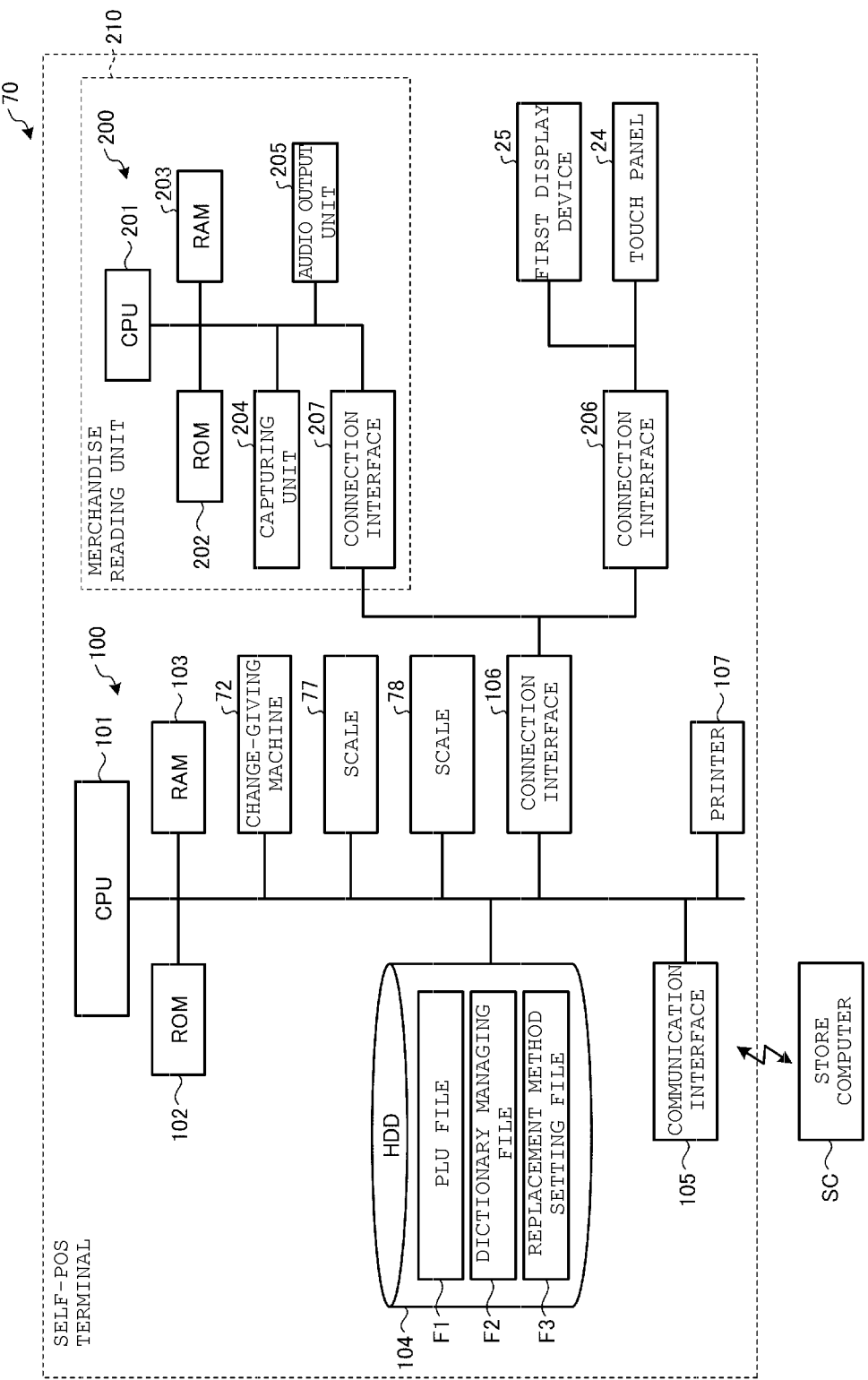
FIG. 13 is a block diagram of the self-POS terminal.

FIG. 12 is a perspective view of a self-POS terminal 70, and FIG. 13 is a block diagram illustrating a hardware configuration of the self-POS terminal 70. Here, the same configurations illustrated in FIGS. 1 and 2 are denoted by the same reference numerals, and the repetitive descriptions are omitted. As illustrated in FIGS. 12 and 13, a cash input/output machine 72 for receiving bills from a customer or discharging bills for change is provided in a main body 71 of the self-POS terminal 70. In addition, the main body 71 includes the first display device 25 including the touch panel 24 provided on the surface thereof and the merchandise reading unit 210 that captures an image of a product to be purchased in order to identify (detect) the product.

As the first display device 25, for example, a liquid crystal display is used. The first display device 25 displays a guide screen for indicating an operation method of the self-POS terminal 70 to the customer, various input screens, a registration screen for displaying the product information (image) captured by the merchandise reading unit 210, the settlement screen for displaying a total amount of the purchase transaction, a deposit amount, and an amount of change and selecting a payment method, and the like.

The merchandise reading unit 210 captures the image of the product when the capturing unit 204 thereof detects a code symbol attached to the product held near the reading window 22 of the merchandise reading unit 210 by the customer.

A merchandise mounting table 73 for putting a shopping basket containing unsettled products is provided on the right side of the main body 71. In addition, a merchandise mounting table 74 for putting scanned products is provided on the left side of the main body 71. A bag hook 75 for hanging a shopping bag for placing scanned products and a temporary placing table 76 for temporarily putting the scanned products before being placed in the bag are provided above the merchandise mounting table 74. In addition, scales 77 and 78 (FIG. 13) are included in the merchandise mounting table 73 and 74 so as to check whether the weights of the products before and after the scanning (settlement) are the same.

When the self-POS terminal 70 having the above-described configuration is applied to the store system, the self-POS terminal 70 functions as the information processing apparatus.

In addition, although programs executed by respective devices according to the above embodiment are installed in advance in a storage medium (ROM or memory unit) included in respective devices, the present disclosure is not limited thereto. For example, the programs may be recorded in a computer-readable recording medium such as a CD-ROM, a flexible disk (FD), a CD-R, and a digital versatile disk (DVD) in an installable format or an executable format. Further, the recording medium is not limited to a medium independent from a computer or an incorporated system, and may include a recording medium that stores or temporarily stores a program that is transmitted through LAN or the Internet and installed therein.

In addition, the programs executed in the respective devices of the above embodiment may be stored on a computer connected to a network such as the Internet, and downloaded via the network.

What is claimed is:

1. An information processing apparatus comprising:
a storage device that stores a plurality of feature values to be used for object recognition and an update program for the feature values, with respect to each of a plurality of products registered for sale, the update program including a first update program corresponding to a first product registered for sale, and a second update program that is different from the first update program, corresponding to a second product registered for sale;
an image capturing device configured to acquire an image of one product out of the plurality of product registered for sale; and
a processor configured to:
extract a feature value of the product from the acquired image,
select one of the plurality of the stored feature values corresponding to the product, for replacement, by executing the update program corresponding to the product, and
replace the selected feature value with the extracted feature value.

2. The information processing apparatus according to claim 1, wherein
the processor is further configured to determine whether or not the storage device has a space for storing a feature value, and
the selected feature value is replaced when it is determined that the storage device does not have the space.

3. The information processing apparatus according to claim 2, wherein
the processor is further configured to store the extracted feature value in the space, when it is determined that the storage device has the space.

4. The information processing apparatus according to claim 1, wherein
the storage device stores a last updated time with respect to each of the feature values stored therein, and
one of the first update program and the second update program causes one of the feature values to be selected for replacement based on the last updated times.

5. The information processing apparatus according to claim 4, wherein
one of the feature values having a last updated time that is the oldest is selected by the one of the first update program and the second update program for replacement.

6. The information processing apparatus according to claim 1, wherein
one of the first update program and the second update program causes one of the feature values to be randomly selected for replacement.

7. The information processing apparatus according to claim 1, wherein
the image capturing device is further configured to acquire an image of a product to be purchased, and
the processor is further configured to
extract a feature value of the product to be purchased from the acquired image thereof, and
select one of the registered products having a feature value that is the most similar to the feature value of the product to be purchased.

8. The information processing apparatus according to claim 7, wherein
the selection of one of the registered products is made from a group of registered products that are candidates, and
a registered product is determined to be a candidate when a similarity value determined by comparing the feature value thereof to the feature value of the product to be purchased, is greater than a predetermined threshold value.

9. The information processing apparatus according to claim 8, wherein
the storage device stores, for each of the registered products, a count of how many times a feature value has been determined to have the highest similarity to the feature value of the product to be purchased and the corresponding registered product has been selected as a candidate, with respect to each of the feature values, and
one of the first update program and the second update program causes one of the feature values to be selected for replacement based on the counts.

10. The information processing apparatus according to claim 9, wherein
one of the first update program and the second update program causes one of the feature values having the smallest count to be selected for replacement.

11. A method for updating feature values of products registered for sale, the feature values being used for object recognition and stored in a storage device of a computing device, the method comprising:
extracting a feature of one product out of the products registered for sale from a captured image thereof;
determining an update program associated with the product from one of a plurality of update programs including a first update program and a second update program, wherein:
the first update program is executed when the first update program is determined to be the associated update program, and
the second update program is different from the first update program and is executed when the second update program is determined to be the associated update program:
selecting one of a plurality of feature values corresponding to the product for replacement, by executing the update program determined to be associated with the product; and
replacing the selected feature value with the extracted feature value.

12. The method according to claim 11, further comprising:
determining that the storage device has a space for storing a feature value, and
the selection is performed in response to the determination.

13. The method according to claim 11, wherein
the storage device stores a last updated time with respect to each of the feature values stored therein, and
one of the first update program and the second update program, when determined to be the update program associated with the product, causes one of the feature values to be selected as the replacement target based on the last updated times.

14. The method according to claim 13, wherein
if one of the first update program and the second update program is determined to be the update program associated with the product, one of the feature values having a last updated time that is the oldest is selected as the replacement target.

15. The method according to claim 11, wherein
one of the first update program and the second update program, if determined to be the update program associated with the product, causes one of the feature values to be randomly selected as the replacement target.

16. The method according to claim 11, further comprising:
with respect to each of a plurality of products to be purchased, extracting a feature value from a captured image of the corresponding product;
with respect to each of the plurality of products to be purchased, selecting one or more candidates from the products registered for sale, based on the feature value of each of the registered products that has highest similarity to the extracted feature value of the product to be purchased; and
for each of the registered products, storing a count of how many times a feature value thereof has been determined to have the highest similarity to the extracted feature value of the product to be purchased and the corresponding registered product has been selected as a candidate, with respect to each of the feature values, wherein
the one of the first update program and the second update program which is the update program associated with the product causes one of the feature values to be selected as the replacement target based on the counts.

17. The method according to claim 16, wherein
if one of the first update program and the second update program is determined to be the update program associated with the registered product, one of the feature values that has the smallest number of times is selected as the replacement target.

* * * * *